United States Patent
Lin

(10) Patent No.: US 7,272,813 B2
(45) Date of Patent: Sep. 18, 2007

(54) TRANSPARENT RE-MAPPING OF PARALLEL COMPUTATIONAL UNITS

(75) Inventor: Bo-Yi Lin, Union City, CA (US)

(73) Assignee: Omnivision Technologies, Inc., Sunnvale, CA (US)

( * ) Notice: Subject to any disclaimer, the term of this patent is extended or adjusted under 35 U.S.C. 154(b) by 389 days.

(21) Appl. No.: 10/942,334

(22) Filed: Sep. 15, 2004

(65) Prior Publication Data

US 2006/0059450 A1    Mar. 16, 2006

(51) Int. Cl.
*G06F 17/50*    (2006.01)
(52) U.S. Cl. .................... 716/16; 716/2; 716/1
(58) Field of Classification Search ............ 716/16, 716/2, 1
See application file for complete search history.

(56) References Cited

U.S. PATENT DOCUMENTS

| | | | |
|---|---|---|---|
| 4,566,102 A | * | 1/1986 | Hefner .................... 714/7 |
| 4,891,810 A | * | 1/1990 | de Corlieu et al. ......... 714/11 |
| 5,369,314 A | | 11/1994 | Patel et al. |
| 6,091,258 A | | 7/2000 | McClintock et al. |
| 6,496,940 B1 | * | 12/2002 | Horst et al. ................ 714/4 |
| 6,697,979 B1 | | 2/2004 | Vorbach et al. |

OTHER PUBLICATIONS

European Search Report; Application No. EP 05 25 5651; Feb. 8, 2006; 5 pages; European Patent Office.

* cited by examiner

*Primary Examiner*—Sun James Lin
(74) *Attorney, Agent, or Firm*—Cooley Godward Kronish, LLP

(57) ABSTRACT

An design architecture for an application specific integrated circuit (ASIC) is disclosed. The design architecture of the ASIC includes a pre-determined number of redundant computational units such that when defective computational units are found during testing, full functionality of the ASIC is maintained by re-mapping functionality from the defective units to the once redundant units. The marking of defective units and the re-mapping of functionality are automated by using self-test logic built into each computational unit in the ASIC. The self-test logic is adapted to allow the corresponding computational unit to self-isolate itself from the data initialization process and to self-disable to avoid any computation when the ASIC is in operation mode. The re-mapping of functionality is achieved by initializing the computational units in the array in a serial manner.

24 Claims, 3 Drawing Sheets

TRANSPARENT RE-MAPPING OF PARALLEL COMPUTATIONAL UNITS

TECHNICAL FIELD

The present invention is directed to integrated circuits, and more specifically to the design architecture of application specific integrated circuits (ASIC) in the context of increasing manufacturing yield of fully functional ASICs.

BACKGROUND

When integrated circuits are manufactured, certain quality control tests are performed on the integrated circuit (IC) chip to ensure that only those chips that are within acceptable margins of functionality are shipped to the consumer. For example, memory tests can be performed on the integrated circuit chip to test for defects in the integrated chip. According to certain approaches, if a given IC chip fails the previously mentioned memory tests, then such an IC chip is marked for rejection and is not shipped to the customer. Other examples of tests are those that test the proper functioning of arithmetic logic units (ALUs) in application specific integrated circuits (ASICs). When one or more ALUs in the IC chip fail specific function tests then the entire IC chip is rejected. Thus, such approaches to quality control testing result in waste and relatively low manufacturing yields. Further, when the tests are performed, an external controller that is independent of integrated circuit's ALUs has to decide which ALUs to remove or disable. Thus, the chip manufacturer either needs to coordinate with the customer's control system for testing of the ASICs or at the very least, the manufacturer needs to design and/or make a separate external controller that is capable of deciding which ALUs to disable in response to the testing results.

In view of the foregoing, a more efficient method is needed to increase the manufacturing yield of functional ASICs in a manner that is transparent to an external controller used in the testing of the ASICs.

DETAILED DESCRIPTION

The manufacturing yield of certain application specific integrated circuits (ASIC) chips that include an array of identical computation units can be improved. According to certain embodiments, the manufacturing yield can be improved by marking defective arithmetic logic units in the ASIC combined with re-mapping of functionality from the defective units to non-defective units. The design architecture of the ASIC includes a pre-determined number of redundant computational units such that when defective computational units are found during testing, full functionality of the ASIC is maintained by re-mapping functionality from the defective units to the once redundant units.

According to one aspect of certain embodiments, the marking of defective units and the re-mapping of functionality are automated by using self-test logic built into each computational unit in the ASIC. The self-test logic is adapted to allow the corresponding computational unit to isolate itself from the data initialization process and to self-disable to avoid any computation when the ASIC is in operation mode.

Further, according to another aspect of certain embodiments, the input of test data for the self-testing is performed in parallel so that the testing of the computational units in the ASIC can be performed in parallel. According to yet another aspect of certain embodiments, the re-mapping of functionality is achieved by initializing the computational units in the array in a serial manner. For example, the computational units in the array can be connected in series. The initialization of the units can begin at the one end of the array. If a defective unit is encountered during the serial initialization, the defective unit is skipped and the initialization data that would have been loaded onto the defective unit is loaded onto the next non-defective unit in the series.

Figure 1:
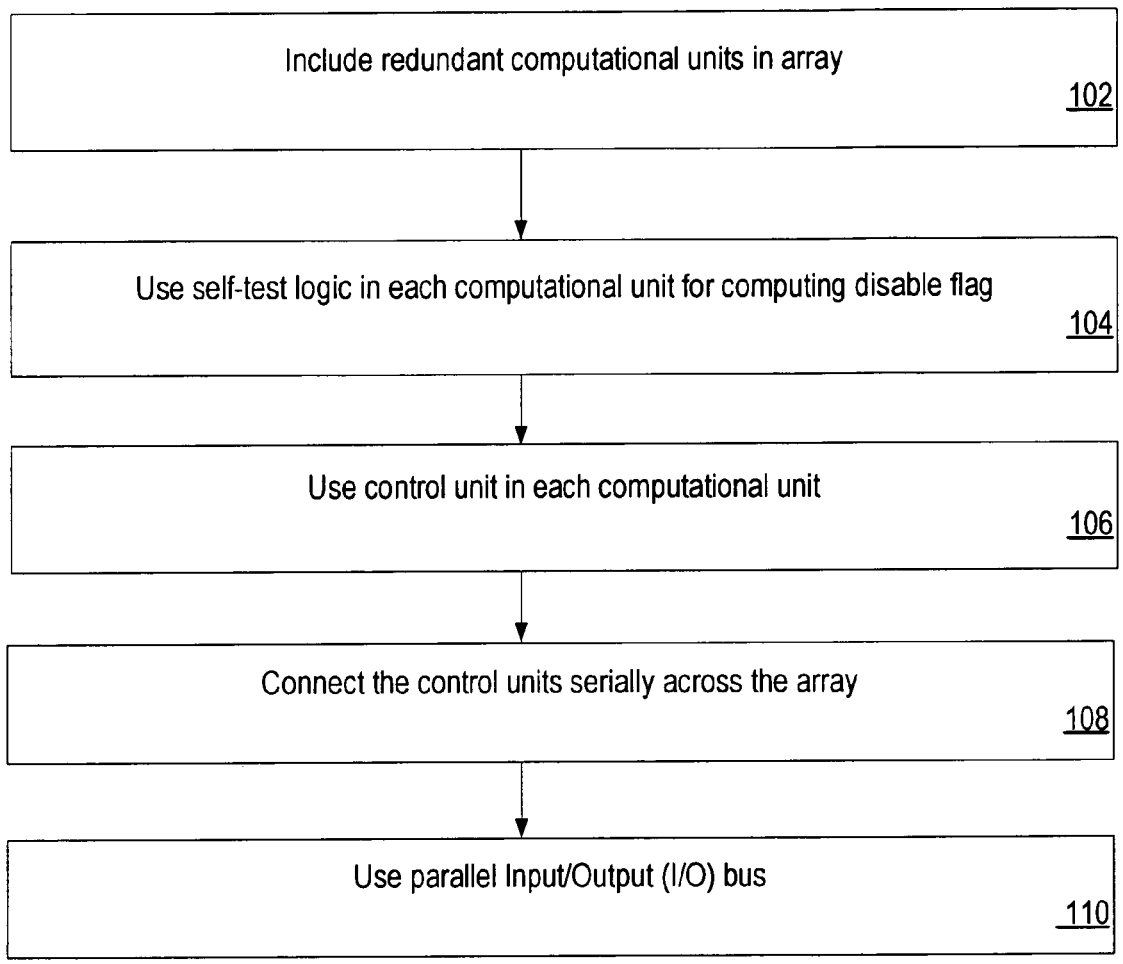
FIG. 1 is a flowchart that illustrates certain aspects in the design architecture of an application specific integrated circuit, according to certain embodiments of the invention.

FIG. 1 is a flowchart that illustrates certain aspects in the design architecture of an application specific integrated circuit, according to certain embodiments of the invention. The flowchart of FIG. 1 is not necessarily indicative of any particular order in which the ASIC is made. At block 102, redundant computational units are included the array of computational units in the design of the ASIC. The computational units in the array are identical in design. The number of redundant computational units depends on the minimum number of computational units that is guaranteed to be operational for in each ASIC. The number of redundant computational units may also depend on an estimated number of defective units that can be expected during manufacture.

At block 104, each computational unit in the array includes self-test logic for computing an indicator for indicating whether the computational unit is defective. For example, the indicator can be a disable-flag. Thus, each computational unit is responsible for calculating the value of its own disable-flag. At block 106, a control unit is included in the design of each computational unit. At block 108, the computational units are connected to each other in a serial manner by connecting the control units in series.

At block 110, a parallel input/output (I/O) network such as a parallel I/O bus is used to input data into the computational units and to receive output data from the computational units. The testing procedure for the computational units of the ASIC is described in greater detail herein with respect to FIG. 2 and FIG. 3.

Figure 2:
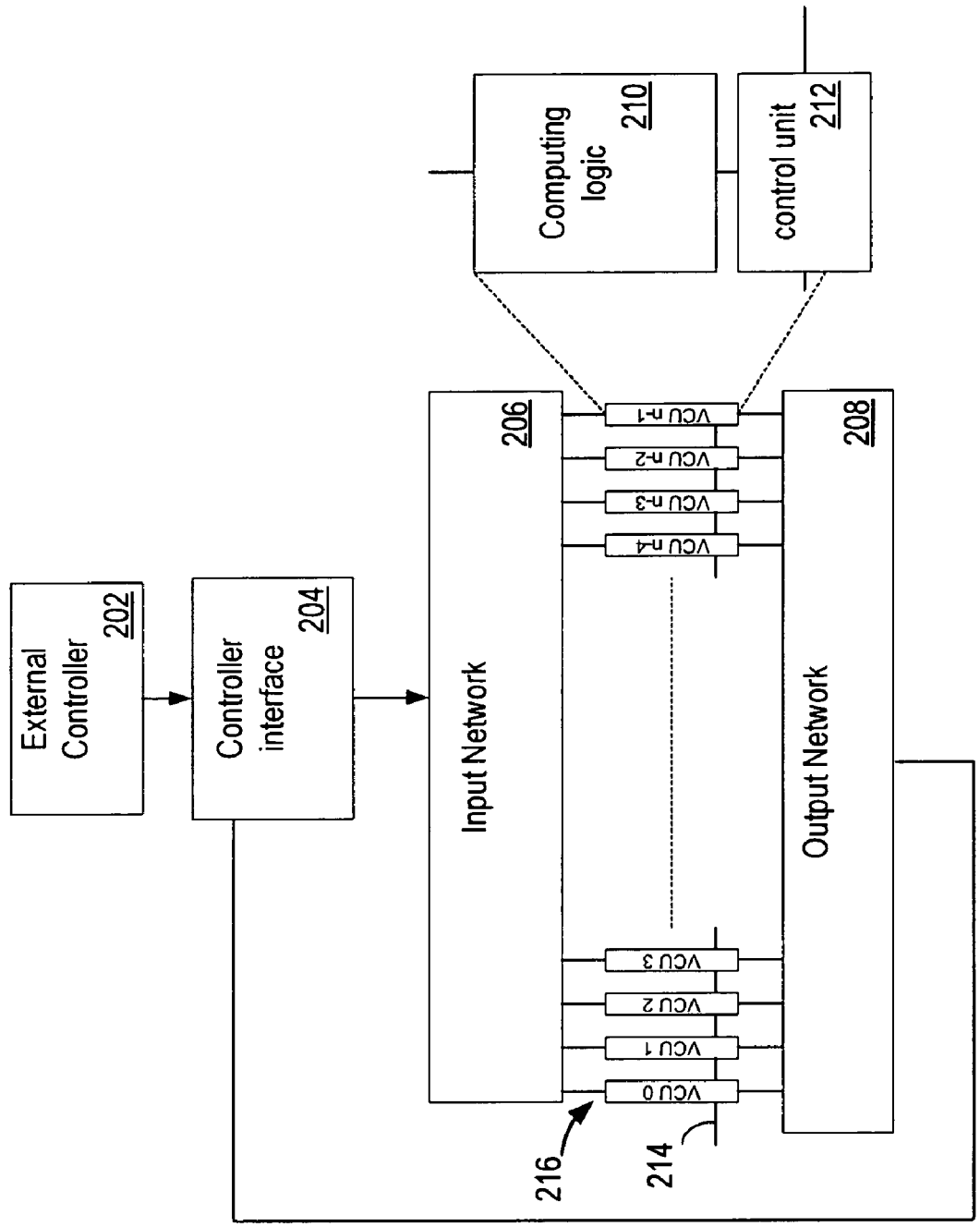
FIG. 2 is a high-level block diagram that illustrates an architecture of an application specific integrated circuit, according to certain embodiments of the invention.

FIG. 2 is a high-level block diagram that illustrates an architecture of an application specific integrated circuit, according to certain embodiments of the invention. FIG. 2 shows an external controller 202 with a controller interface 204. Controller interface is operationally in communication with an input network 206. Input network 206 is connected to an array 216 of identical computational units. The computational units in array 216 is connected to an output network 208. Input network 206 and output network 208 are part of a parallel I/O bus, for example. Each of the computational units in array 216 includes a computing logic portion 210 and a control unit 212. The computational units in array 216 are connected in series by a serial connection 214. The serial connection can be a daisy chain, for example, that connects the control unit 212 of one computational unit to the next.

Computing logic 210 includes the computational logic needed to carry out the computational functions of the ASIC. Each computational unit includes a self-test and self-disabling logic (not shown in FIG. 2). The self-test and self-disabling logic may be part of computing logic 210. Alternatively, the self-test and self-disabling logic may be separate from computing logic 210 and thus may vary from implementation to implementation. In FIG. 2, array 216 includes N number of computational units, where N is a positive integer. The N number of units includes a pre-determined number of redundant computational units. The pre-determined number of redundant units depends on the number of non-defective, i.e., functional units, that is guaranteed to the customer of the ASICs.

The embodiments are not limited to any particular type of ASICs. Thus, the array of computational units can be an array of any type of arithmetic units wherein the arithmetic units are identical to each other. One example is an array of identical vector computing units (VCU). Vector computing units can be used for, among other functions, calculating distances from an internally stored reference vector to a given input vector. The use of VCUs in the context of ASICs is described in greater detail herein with respect to FIG. 3.

Figure 3:
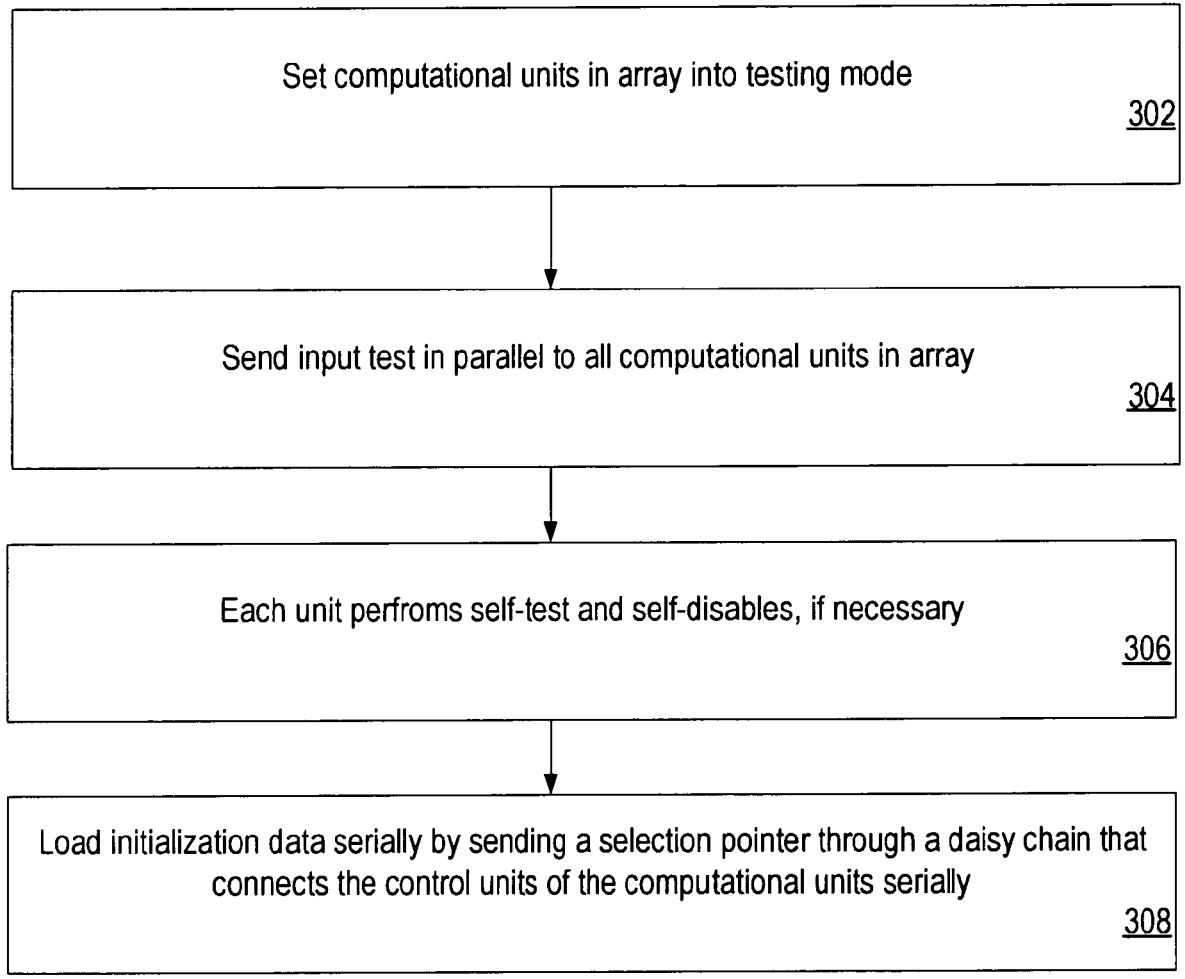
FIG. 3 is a flowchart that illustrates certain aspects in the testing and initialization of an application specific integrated circuit, according to certain embodiments of the invention.

FIG. 3 is described with reference to FIG. 2. FIG. 3 is a flowchart that illustrates certain high-level aspects in the testing and initialization of an ASIC having a design adapted for self-testing and self-disabling, according to certain embodiments of the invention. At block 302, the computational units in the array, such as array 216, are set into testing mode. For example, external controller 202 of FIG. 2 can set the testing mode using controller interface 204 for array 216.

At block 304, input test data is sent in parallel to all the computational units so that each of the computational units can conduct their respective self-tests simultaneously. At block 306, each computational unit performs self-tests and self-disables, if necessary, upon receiving failing results from the self-tests. For example, each unit can be adapted to calculate a value for a disabling indicator, such as a disable-flag. Upon failing the self-test, the disable-flag at the defective unit can be turned on to prevent the defective computational unit from being initialized and from participating in the normal operations of the ASIC. According to certain embodiments, the disabling indicator is volatile, i.e., non-persistent. Thus, if the ASIC is powered-down, the disabling indicator is reset and needs to be re-calculated when the ASIC is powered-up. Further, the external controller, such as controller 202 of FIG. 2 is agnostic as to the presence of defective units in the array due to the built-in self testing logic in each computational unit. Thus, any self-disablement from operation or any self-isolation from initialization of defective units is transparent to external controller.

At block 308, a sequence of initialization data is loaded in a serial fashion onto the computational units. For example, referring to FIG. 2, array 216 can be initialized starting with VCU0, the leftmost unit in the array. The control unit of VCU0 is connected in series to the control unit of VCU1, which in turn is connected in series to the control unit of VCU2, and so forth. Thus the VCUs in array 216 are connected in series by a serial connection such as a daisy chain, for example.

Before the initialization data is loaded onto VCU0, the control unit checks the value of the disable flag at VCU0. If the disable-flag has a value that indicates that the unit is defective, the initialization data that was initially targeted for loading onto VCU0 is sent to VCU1 instead. At VCU1, the control unit at VCU1 checks the value of the disable flag at VCU0. If the disable-flag has a value that shows that VCU1 is enabled, then the initialization data is loaded onto VCU1. Next, an attempt is made to load the next computational unit in the serial connection, namely, VCU2. The next set of initialization data from the sequence of initialization data is loaded onto VCU2 if the control unit in VCU2 determines that VCU2 is enabled as indicated by VCU2's disable-flag. Thus, the sequence of initialization data is loaded onto array 216 in a serial manner by skipping the defective units as indicated by the value of the disable-flag in each computational unit. The presence of redundant computational units in the array allows for the entire sequence of initialization data to be loaded onto the array despite the occurrence of defective units in the array. Thus, the presence of a sufficient number of redundant units in the array and the serial manner of loading initialization data allow for the re-mapping of the sequence of initialization data amongst the non-defective computational units in the array.

Further, each of the computational units is adapted to remove itself from the normal operations of the VCU if the computational unit is self-determined to be defective. For example, during normal operations, a defective computational unit will refrain from making any calculations and/or refrain from sending any output to the I/O parallel bus. Even though defective computational units in the array do not send any output to the I/O parallel bus, the external controller, such as controller 202, is agnostic as to the presence of defective units due to the parallel nature of the I/O bus.

The efficacy of the ASIC design architecture as described above can be elaborated by further describing the testing of VCUs. The mains functions of each VCU in the array, such as array 216 of FIG. 2, are 1) storing an n-dimensional vector at the VCU as an internal vector, 2) receiving an input vector and calculating the distance between the internal vector and the input vector, and 3) comparing and sorting the calculated distance with other enabled VCUs in the array. The stored internal vector is also known as a prototype. Even though a parallel bus is used for loading the sequence of prototypes, the prototypes are entered one-by-one in a serial fashion into the array during the array initialization. The role of the serial connection, such as a daisy chain, between the VCUs is to provide a pointer for selecting a given VCU for receiving a prototype. Such a pointer is adapted to point to enabled VCUs only for receipt of prototypes. Only the VCUs to which the daisy chain points will receive a prototype from the sequence of prototypes. The prototypes that are originally targeted for those VCUs that are found to be defective are re-mapped for loading to other enabled VCUs in the array. The re-mapping is possible due to the presence of a number of redundant VCUs in the array. Such a re-mapping is, by design, transparent to the external controller.

After initialization of the array of VCUs, the array enters the normal operations phase. Whenever, a new input vector is sent through the I/O interface, such as an parallel I/O bus, all the enabled VCUs perform vector-to-vector distance calculations in parallel. The enabled VCUs output results in parallel into the parallel I/O bus.

In the foregoing specification, embodiments of the invention have been described with reference to numerous specific details that may vary from implementation to implementation. It will be evident that various modifications and changes may be made thereto without departing from the broader spirit and scope of the invention. The specification and drawings are, accordingly, to be regarded in an illustrative rather than a restrictive sense.

I claim:

1. A method for making an integrated circuit with an array of identical computational units on said integrated circuit, the method comprising:

including a predetermined number of redundant computational units in said array of identical computational units;

using a self-disabling logic in each of said identical computational units in said array, wherein said self-disabling logic is adapted to preventing loading of initialization data and operation of defective computational units, if any; and automatic re-mapping from said defective computational units to non-disabled computational units in said array for receiving said initialization data that was prevented from being loaded at said defective computational units wherein said automatic re-mapping includes using a data loading mechanism for loading said initialization data to each of said non-disabled computational units in a serial manner, said initialization data including control data, said data loading mechanism including a pointer for pointing to a current computational unit in said array for loading said initialization data, and wherein said pointer is sent through a serial connection connecting said identical computational units in said array.

2. The method of claim 1, further including performing testing on all computational units of said array in parallel for identifying said defective computational units.

3. The method of claim 2, wherein testing is performed each time said integrated circuit is powered-up.

4. The method of claim 2, further including using an input network for performing said testing.

5. The method of claim 4, wherein said input network is associated with an I/O parallel bus of said integrated circuit.

6. The method of claim 2, further including using an indicator mechanism in each of said identical computational units for indicating whether each of said identical computational units is disabled based on said testing.

7. The method of claim 6, wherein said indicator mechanism is a disable-flag corresponding to each of said identical computational units.

8. The method of claim 7, wherein each said identical units computes said corresponding disable-flag.

9. The method of claim 1, wherein said re-mapping is adapted to achieve full functionality of said integrated circuit.

10. The method of claim 1, wherein said integrated circuit is an application specific integrated circuit.

11. The method of claim 1, wherein said defective computation units are disabled from receiving any input data for processing from an I/O parallel bus associated with said integrated circuit.

12. The method of claim 1, wherein said defective computation units are disabled from outputting any processed data to an I/O parallel bus associated with said integrated circuit.

13. The method of claim 1, wherein said data loading mechanism forwards said initialization data that is not loaded onto disabled computational unit to a next computational unit in said array.

14. The method of claim 1, further including using a daisy chain control unit in each of said identical computational unit.

15. The method of claim 14, wherein said daisy chain control unit is adapted for receiving and outputting control data through corresponding input and output control ports.

16. The method of claim 1, wherein said each of said identical computational unit includes computing logic for processing data.

17. The method of claim 1, further including using an I/O parallel bus to carrying output data from said non-disabled computational units.

18. An integrated circuit, the integrated circuit comprising:
a plurality of identical computational units in an array wherein said plurality of identical computational units include a pre-determined number of redundant computational units; and
self-testing and self-disabling logic in each of said plurality of identical computational units configured to prevent loading of initialization data and operation of defective computational units, if any, said self-testing and self-disabling logic configured to provide automatic re-mapping from defective computational units to non-disabled computational units in said array for receiving said initialization data that was prevented from being loaded at said defective computational units wherein said self-testing and self-disabling logic is configured to prevent loading of initialization data and operation of defective computational units, if any using a data loading mechanism for loading said initialization data to each of said non-disabled computational units in a serial manner, said initialization data including control data, said data loading mechanism including a pointer for pointing to a current computational unit in said array for loading said initialization data, and wherein said pointer is sent through a serial connection connecting said identical computational units in said array.

19. The integrated circuit of claim 18, further including a parallel input/output network adapted from sending testing input data to said plurality of identical computational units in parallel.

20. The integrated circuit of claim 18, further including a parallel input/output network adapted from receiving output data from said plurality of identical computational units in parallel.

21. The integrated circuit of claim 18, further including, in each of said plurality of identical computational units, an indicator mechanism associated with said self-testing and self-disabling logic wherein said indicator mechanism is adapted for indicating whether said each of said plurality of identical computational units is defective.

22. The integrated circuit of claim 18, further including a control unit in each of said plurality of identical computational units, wherein said control units are connected by said serial connection.

23. A method for operating an integrated circuit with an array of identical computational units on said integrated circuit including predetermined number of redundant computational units in said array of identical computational units, the method comprising:
using a self-disabling logic in each of said identical computational units in said array, wherein said self-disabling logic is configured to prevent loading of initialization data and operation of defective computational units, if any; and
re-mapping from said defective computational units to non-disabled computational units in said array for receiving said initialization data that was prevented from being loaded at said defective computational units wherein said re-mapping includes using a data loading mechanism including a pointer for pointing to a current computational unit in said array for loading said initialization data, and wherein said pointer is sent through a serial connection connecting said identical computational units in said array.

24. An integrated circuit, the integrated circuit comprising:
a plurality of identical computational units in an array wherein said plurality of identical computational units include a pre-determined number of redundant computational units; and
self-testing and self-disabling logic in each of said plurality of identical computational configured to prevent loading of initialization data and operation of defective computational units, if any; said self-testing and self-disabling logic re-mapping from said defective computational units to non-disabled computational units in said array a data loading mechanism including pointer for pointing to a current computational unit in said array for loading said initialization data, and wherein said pointer is sent through a serial connection connecting said identical computational units in said array.

* * * * *

UNITED STATES PATENT AND TRADEMARK OFFICE
CERTIFICATE OF CORRECTION

| | | |
|---|---|---|
| PATENT NO. | : 7,272,813 B2 | Page 1 of 1 |
| APPLICATION NO. | : 10/942334 | |
| DATED | : September 18, 2007 | |
| INVENTOR(S) | : Bo-Yi Lin | |

It is certified that error appears in the above-identified patent and that said Letters Patent is hereby corrected as shown below:

<u>Column 2,</u>

Line 49, please insert --204-- after "Controller interface…;

<u>Column 3,</u>

Line 56, please delete "disable flag" and insert --disable-flag--; and

<u>In Fig. 3,</u>

Step 306 please delete "perfroms" and insert --performs--;

Signed and Sealed this

Twenty-fifth Day of December, 2007

JON W. DUDAS
*Director of the United States Patent and Trademark Office*